United States Patent [19]
Klein

[11] 3,727,605
[45] Apr. 17, 1973

[54] LARYNGOSCOPE
[76] Inventor: Harold C. Klein, 2957 South Park Boulevard, Shaker Heights, Ohio 44120
[22] Filed: Dec. 10, 1970
[21] Appl. No.: 96,862

[52] U.S. Cl. .................................................. 128/11
[51] Int. Cl. ............................................... A61b 1/26
[58] Field of Search .................... 128/3, 10, 11, 15, 128/16; 224/28 C, 28 R

[56] References Cited

UNITED STATES PATENTS

| | | | |
|---|---|---|---|
| 914,975 | 3/1909 | Radley | 128/23 UX |
| 2,165,625 | 7/1939 | Fessel | 224/28 C X |
| 3,435,820 | 4/1969 | Taub | 128/11 |
| 455,972 | 7/1891 | Oudin et al. | 128/23 |
| 1,887,888 | 11/1932 | Malatesta | 128/10 X |
| 1,945,380 | 1/1934 | Russell | 128/11 |

FOREIGN PATENTS OR APPLICATIONS

| | | | |
|---|---|---|---|
| 212,474 | 8/1909 | Germany | 128/11 |
| 1,082,478 | 6/1953 | France | 128/3 |

*Primary Examiner*—Lucie H. Laudenslager
*Attorney*—Isler and Ornstein

[57] ABSTRACT

An optical viewing tube slidably mounted in a steady rest which is contoured to fit a portion of the hand of the examiner and be mounted thereon in a manner to permit the fingers of the hand to grasp the tongue of the subject being examined while the larynx is viewed through the viewing tube.

7 Claims, 3 Drawing Figures

PATENTED APR 17 1973 3,727,605
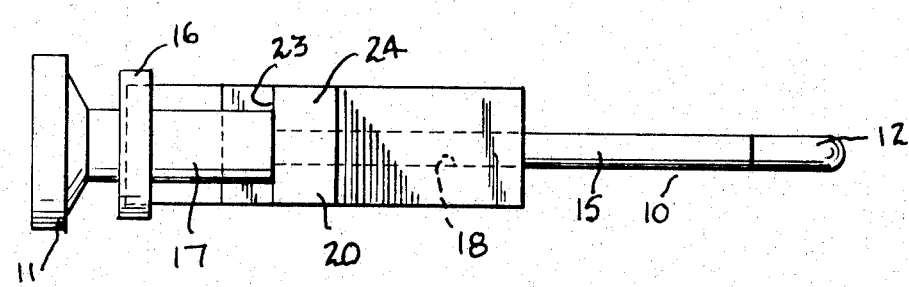
FIG. 1
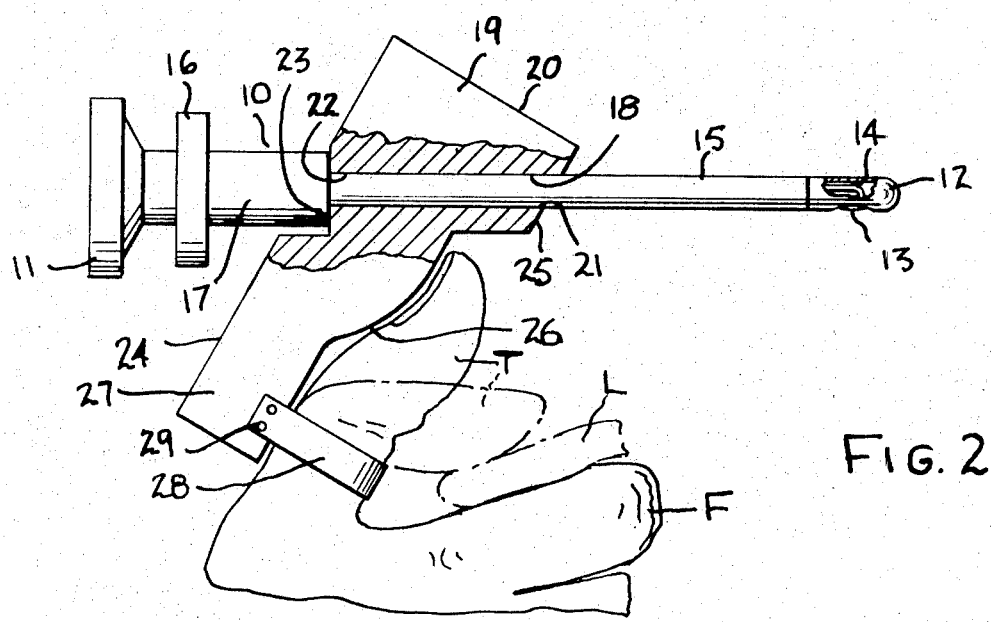
FIG. 2
FIG. 3
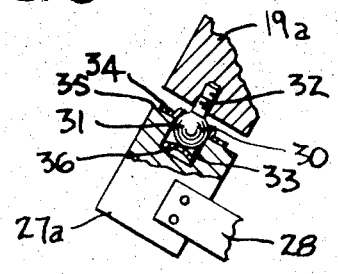
INVENTOR.
HAROLD C. KLEIN
BY
Isler & Ornstein
Attorneys.

LARYNGOSCOPE

BACKGROUND OF THE INVENTION

The human larynx may be the site of inflammation, malignant growths, or other varied abnormalities which may produce warning symptoms or may be silent in their incipience. It is therefore necessary that the larynx of a patient or subject be inspected or viewed by a physician or medical examiner either to explore a complaint or symptom or to discover an early silent growth when it is much more amenable to treatment. The larynx is not examined routinely because of the technical difficulty of viewing it in its hidden position behind and below of the base of the tongue in a highly sensitive area of the throat.

There are three methods available to examine the larynx. The most common technique is to use a combination of mirrors; one of these mirrors being a small hand-held angled mirror and the other being a head mirror strapped to the forehead of the examiner. The head mirror is used to direct light toward the angled mirror, which the examiner rests on the back of the throat of the subject in a position to view and illuminate the larynx area, while holding the tongue forward with the other hand. This is technically difficult, is time consuming, and requires much training and ability on the part of the examiner. It is therefore utilized almost exclusively by the specialist in the field.

Another form of laryngoscope is a right angle, self illuminated telescope that is passed through the mouth or through the nose to the back of the throat. This technique also presents difficulties to both patient and examiner and has not afforded any great advantage over other methods.

A third form of laryngoscope is simply a hollow tube which is inserted in the throat of the patient for direct viewing of the larynx through the opposite end. This type of laryngoscope is normally used in association with surgical or operative procedures in an operating room environment where the subject has been anesthetized so as not to sense the discomfort or pain involved.

Under present procedures it is a common occurrence for the subject to gag, vomit or resist these examinations. Although some patients or subjects are more sensitive than others to the physical presence of a foreign object on the back of the throat or on the surrounding tissue areas, the routine examination of the larynx ordinarily produces such fear and discomfort in the patient as to cause physicians to neglect it unless a specific symptom or complaint makes such an examination mandatory. If the gagging, vomiting and discomfort now associated with this examination can be overcome, and if it could be made technically simple and quick, the viewing of the larynx could and should become part of routine physical examination.

SUMMARY OF THE INVENTION

It is the primary object of the invention to provide a device which is technically simple and which will permit examination of the larynx without the consequential gagging and discomfort so frequently associated with present techniques of examination. This can be accomplished by providing an optical viewing instrument containing its own light source, combined with a steady rest attached to the hand of the examiner which will permit the viewing instrument to be steadied or rested in a fixed position for effective viewing of the larynx area, without need for the instrument to be in contact with the back of the throat or the surrounding areas.

Thereby, this viewing instrument obviates the examiner's difficulties in attempting to simultaneously manipulate his light source, the patient's tongue, and the angle of his reflecting mirror to afford him an adequate view, and by avoiding contact with the patient's throat the stimuli that would induce gagging or discomfort are minimized.

BRIEF DESCRIPTION OF THE DRAWING

FIG. 1 is a plan view of a laryngoscope embodying the features of the invention.

FIG. 2 is a view in side elevation of the laryngoscope shown in FIG. 1 as it is mounted on the hand of the examiner.

FIG. 3 is a fragmentary view in side elevation of the lower portion of the steady rest for the viewing instrument, showing a modified form thereof.

DESCRIPTION OF THE PREFERRED EMBODIMENTS

As illustrated in FIGS. 1 and 2 of the drawings, there is shown an optical viewing tube 10 having an eye piece or ocular end 11 and an objective end 12 having a field of view at substantially right angles to the line of sight defined by the longitudinal axis of the viewing tube. The viewing tube utilizes conventional optical principles in which mirrors, lenses, prisms or combinations of these elements are mounted in predetermined spaced and angular relationship to each other within the viewing tube so as to reflect or refract an image through an objective lens 13 to the eye of the viewer at the ocular or eye piece 11. In the present instance, it is desirable that the viewing tube be optically arranged for right angle viewing, but the particular optical arrangement which may be utilized for accomplishing this is of no significance to the invention, as such arrangements are conventional in nature and well known in the art of optics, so as to require no detailed description.

Illumination of the field of view is preferably provided by any convenient light source of a conventional nature carried on or within the viewing tube adjacent the objective end thereof, such as a light-transmitting rod 14 indicated in FIG. 2 of the drawings.

In addition to the ocular 11, which will customarily be of substantially greater diameter than the main body 15 of the viewing tube, the viewing tube may also be provided with lens housings or coupling fittings such as at 16 and 17, which are also of larger diameter than the main body 15 of the viewing tube. It is desirable that these portions of larger diameter all be adjacent to the ocular end of the viewing tube and that the main body 15 which lies forwardly of these portions of enlarged diameter be of substantially uniform diameter throughout its length so that it can be slidably accommodated with a fairly reasonable fit in the opening 18 which transverse the upper portion 19 of a steady rest 20.

The steady rest 20 may be made of any suitable material such as metal, wood, synthetic resin or the like which is suitable for the intended purpose and preferably light in weight. For purposes of clarity in explanation, the previously mentioned opening 18 may be considered as having a front end 21 and a back end 22 which terminates at a notched or recessed portion 23 in the back edge or face 24 of the steady rest.

The opening 18 is directed angularly through the upper portion 19 of the steady rest so that its front end 21 is elevated with respect to its back end 22 when the back edge 24 of the steady rest is in a substantially vertical position. The recessed surface 23 provides a seat or abutment for the portion 17 of the viewing tube which is disposed resrwardly of the main body 15 of the tube and is of larger diameter than the opening 18. The opening 18 is of somewhat larger diameter than the diameter of the main body 15 of the tube and can be sufficiently large so as to slidably accommodate the main body of the tube with convenience and without undue friction as the tube is inserted into the back end 22 and projected forwardly to the desired extent from the front end 21 of the opening 18. However, it is desirable that the fit between the opening 18 and the main body 15 be reasonably close so that the tube will not be free to wobble erratically or slide out of the opening during the time that the laryngoscope is being manipulated by the examiner.

The front edge 25 of the steady rest 20 is preferably contoured to conform generally to the configuration of the back of one or more fingers of a hand. In the illustrated form of FIG. 2, the front edge 25 is shown contoured as at 26 to comfortably accommodate the back of the thumb finger T, as this is the preferred technique, but it will be understood that it could just as readily be contoured to accommodate the back of an index finger or of a middle finger or of both these fingers, if so desired. It will be apparent that if the comfort of the examiner is not to be a consideration, the front edge 25 of the steady rest need not be contoured at all, but could merely be a plane edge such as the back edge 24 against which the back of the finger or fingers of the examiner would rest.

The lower portion 27 of the body of the steady rest 20 may have associated therewith any suitable form of mounting means or securing means for detachably or releasably securing the steady rest to the hand of the examiner. Such means is here shown as an elastic band 28 having its opposite ends secured to the steady rest as indicated at 29. It will be understood that the element 28 could also be a spring steel clip or other resilient or non-resilient means suitable for the purpose.

In using the laryngoscope, the examiner first attaches the steady rest to his thumb so that the fitting 28 grasps the proximal phalanx and the back of the thumb rests against the front edge 25 of the lower portion of the steady rest, so that the thumb and other fingers are in a position to extend forwardly of the steady rest in the direction of the objective end of the viewing tube. The distal phalanx of the thumb is free to grasp the tongue L of the subject between the thumb and bent index finger F as indicated in phantom outline in FIG. 2.

Inasmuch as the normal position of repose of the hand when in the position shown in FIG. 2, is that the thumb is inclined downwardly to the vertical, this position of the thumb will tilt the steady rest 20 downwardly and bring the longitudinal axis of the opening 18 and of the viewing tube 10 into a substantially horizontal position due to the angular disposition of the opening 18 relatively to the general plane of the front edge 25 of the steady rest. By providing this angular relationship, it is unnecessary for the examiner to dispose his hand or thumb in any strained or cramped position in order to maintain the axis of the viewing tube in a proper posture for the examination of the larynx.

With the tongue immobilized and the steady rest in position, the examiner then slides the objective end 12 of the viewing tube 10 into the back end 22 of the opening 18 and guides the tube forward through the oral cavity to a position near the back of the throat and beyond the base of the tongue where the larynx enters the field of vision of the objective lens 13. The tongue is maintained slightly forwardly to prevent its interference with the viewing tube or with the visual examination and the examiner maintains his grasp upon the tongue during the examination procedure, using the tongue and lower portion of the mouth of the patient as a support or rest for his hand, thus steadying the laryngoscope. By this procedure, no part of the viewing tube need be in physical contact with the back of the throat of the subject or any of the adjacent tissue areas, so that the subject has no sensation of physical contact at the back of his throat and there is no tendency for gagging, irritation, vomiting or any of the other physically or psychologically induced reactions which occur when such physical contact is present. In addition, the examiner utilizes a single hand to accomplish the double purpose of holding the subject's tongue and steadying the instrument in an ideal position. This frees the other hand to manipulate the light source and viewing tube.

The examiner places his eye to the ocular 11 and can easily manipulate the objective end of the viewing tube to the desired viewing position by very slight movement of his thumb or hand, without releasing the grasp upon the tongue L. Furthermore, if the examiner finds that the viewing tube is projecting too far forwardly, so as to make his manipulation awkward or clumsy, he can slidably retract the viewing tube with respect to the opening 18 to a more suitable position of projection. It will be understood, of course, that during the examination the light transmitting rod 14 or other source of illumination will be energized to illuminate the field of view.

By utilizing this procedure and technique of examination, a very effective visual examination of the interior of the larynx can be accomplished quickly and conveniently with a minimum of discomfort to the patient. The matter of which finger or fingers the steady rest shall be attached to is a matter of choice by the examiner, but ordinarily it will be most effective and convenient to attach the steady rest to the thumb finger, as described.

In FIG. 3 of the drawings, a modification of the steady rest is shown in which the upper portion 19a of the modified steady rest has a swivel connection 30 with the lower portion 27a of the steady rest. As illustrated, the swivel connection 30 is shown as a ball joint consisting of a ball 31 having a shank portion 32 threadedly secured in the upper body portion 19a so as to permit the ball to project therefrom. The ball 31 is received in a cavity 33 in the lower portion 27a and is retained therein by a conforming cover plate 34 which is secured in any suitable manner to the adjacent edge 35 of the portion 27a.

The bottom of the ball 31 rests upon a resilient element such as a leaf spring 36, which is disposed in the cavity 33 and urges the ball upwardly therefrom into frictional contact with the retaining cover plate 34. This arrangement causes the ball to be yieldably retained in any selected position of adjustment.

The swivel joint does not change or alter the functional characteristics of the laryngoscope, as previously described nor does it alter the technique of examination previously described. The modification is essentially for the comfort of the examiner and permits adjustment of the upper portion of the steady rest, which carries the viewing tube 20, relatively to the lower portion of the steady rest which is attached to the hand of the examiner. Thereby, if the hand of the examiner in its normal position of repose tends to have a greater angle in a forward or rearward or lateral direction than is customary, the examiner can adjust the upper portion of the steady rest relatively to the lower portion and thus establish an examining posture of the viewing tube which will relieve any strain or awkwardness on the hand to which the steady rest is attached.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. A laryngoscope comprising an optical viewing tube having an ocular end and an objective end, a light source associated with said viewing tube to provide illumination at the objective end, a steady rest slidably associated with said tube, said steady rest comprising a lower portion extending angularly to the axis of the viewing tube, and mounting means provided on said lower portion and extending forwardly toward said objective end whereby to detachably secure at least one finger of the examiner for tongue-engaging position.

2. A combination as defined in claim 1, wherein said viewing tube is optically arranged for substantially right angle viewing to the line of sight of the examiner.

3. A combination as defined in claim 1, wherein said steady rest is traversed by an aperture and said viewing tube is accommodated in said aperture to traverse said steady rest to any desired position of projection therefrom.

4. A combination as defined in claim 1, wherein said mounting means comprises a resilient band.

5. A combination as defined in claim 1, wherein said steady rest is provided with a peripheral contour conforming generally to the outline of the back of the thumb finger of a hand.

6. A combination as defined in claim 1, including an upper body portion of said steady rest for supporting said viewing tube, and an adjustable swivel connecting said upper body portion to said lower portion for relative pivotal movement between said portions.

7. A combination as defined in claim 6, wherein said swivel is spring-loaded for yieldably maintaining said body portions in a selected position of pivotal adjustment.

* * * * *